March 5, 1957 R. E. BOYDEN ET AL 2,783,939

RECORDING DEVICE FOR ELECTRONIC COUNTERS OR THE LIKE

Filed March 15, 1954 5 Sheets-Sheet 1

INVENTORS,
Robert E. Boyden
& John L. Lindesmith
BY
ATTORNEY.

March 5, 1957 R. E. BOYDEN ET AL 2,783,939

RECORDING DEVICE FOR ELECTRONIC COUNTERS OR THE LIKE

Filed March 15, 1954 5 Sheets-Sheet 2

INVENTORS,
Robert E. Boyden
& John L. Lindesmith

BY [signature]

ATTORNEY

March 5, 1957 R. E. BOYDEN ET AL 2,783,939

RECORDING DEVICE FOR ELECTRONIC COUNTERS OR THE LIKE

Filed March 15, 1954 5 Sheets-Sheet 3

INVENTORS,
Robert E. Boyden
BY & John L. Lindesmith

ATTORNEY.

INVENTORS,
Robert E. Boyden
BY & John L. Lindesmith

ATTORNEY.

INVENTORS,
Robert E. Boyden
BY & John L. Lindesmith
Fred W. Schmidt
ATTORNEY.

United States Patent Office 2,783,939

Patented Mar. 5, 1957

2,783,939

RECORDING DEVICE FOR ELECTRONIC COUNTERS OR THE LIKE

Robert E. Boyden and John L. Lindesmith, San Gabriel, Calif., assignors to Clary Corporation, a corporation of California Application March 15, 1954, Serial No. 416,143

2 Claims. (Cl. 235—58)

This invention relates to read-out equipment for electric and electronics computing equipment of a digital nature.

Heretofore, read-out equipment for the above purpose has generally comprised a typewriter, adding machine or the like, having either depressible keys or the equivalent which are actuated by individual electromagnets or solenoids. Such electromagnets or solenoids are usually connected through separate circuits, to the electric or electronic equipment.

Such read-out machines operate very satisfactorily. However, particularly in the case of the so-called "full key keyboard" type of read-out machines, the cost of embodying separate electromagnets or solenoids for the different keys or similar elements tends to become excessive. Also, because such keys are normally spaced rather closely together to facilitate depression thereof, problems are encountered in designing solenoids or electromagnets having sufficient power and heat dissipation qualities in view of special limitations.

Further, in machines of the two phase type, either of the ten key type or the full key keyboard type, wherein amounts are first entered into the keyboard by depression of the keys and thereafter the machine is actuated to record and/or accumulate such amounts, a certain amount of time must be allowed for entry of the amounts, in addition to the time required for operation of the machine.

Therefore, it becomes the principal object of the present invention to reduce the number of electromagnetic devices and circuits required to transfer amounts from an electric or electronic computing apparatus to a read-out machine for recording and/or accumulating such amounts.

Another object is to enable a single electromagnetic device to differentially control movement of a registering or recording element to any of a plurality of different numeral positions.

Another object is to reduce the time required to read-out amounts from an electric or electronic apparatus.

Another object is to independently and simultaneously transfer amounts from various decades of an electronic counter or accumulator to read-out machine.

A further object is to provide a simple and inexpensive read-out system for a pulse or impulse actuated counter or accumulator.

The manner in which the above and other objects of the invention are accomplished will be readily understood on reference to the following specification when read in conjunction with the accompanying drawings, wherein:

Fig. 1 is a general schematic view of a read-out system embodying the present invention.

Figs. 2 and 3, when combined, illustrate a circuit diagram disclosing read-out controls and an electronic counter decade and circuit connections for controlling a differential actuator in the corresponding denominational order of the read-out machine.

*General arrangement*

Figure 1:
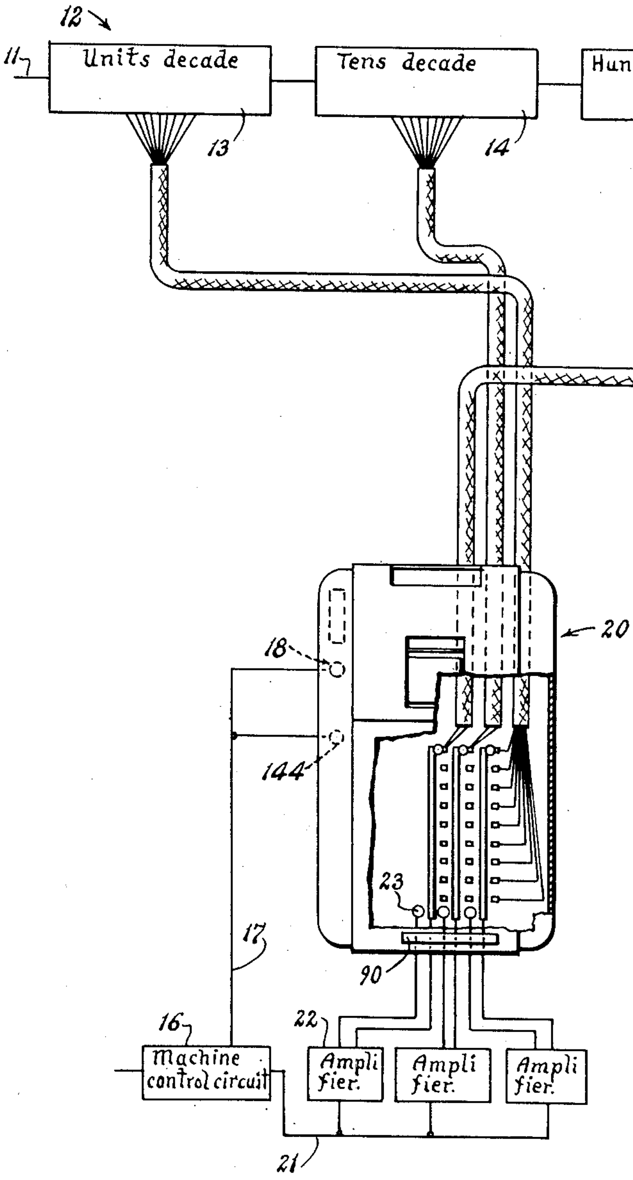

In order to first obtain a general understanding of the read-out system embodying the present invention, reference is had to Fig. 1, illustrating, in general, the various operating components of the present system.

Pulses to be counted are applied to an input line 11 and fed to an electronic counter 12 comprising three counter decades 13, 14 and 15 connected in cascade. Each of the latter decades is of the decimal or ring type having ten counting stages. Suitable circuit arrangements are provided to transfer a carryover or tens transfer pulse from one decade to next higher order decade upon accumulation of ten pulses.

When it is desired to record or register the number of pulses accumulated by the counter, a machine control circuit 16 is energized. The latter, through a circuit 17 effects operation of a machine initiating solenoid, generally indicated at 18. The latter is embodied in a cyclically operable read-out machine, generally indicated at 20, having a mechanical accumulator and a printing mechanism to be described hereinafter. The solenoid 18 is effective to cause a cycle of operation of the machine 20.

Simultaneously, a circuit 21 is completed to condition a series of amplifier circuits 22, one for each denominational order of the machine. Each of the latter circuits is effective to energize a respective order of the machine to arrest a differential actuator located in that order. Each actuator, in turn, carries a brush element which is continually in circuit with the respective amplifier circuit. As the actuator advances, the brush element successively makes contact with different ones of a series of contacts connected to associated ones of the ten stages of the associated counter decade. The latter contacts are spaced apart distances equal to the incremental advance of the actuator from one numerical position to the next.

During advancement of the actuator it will accordingly be successively electrically connected to the successive higher order ones of the counter stages until an activated stage is reached representing a numerical value registered by the decade The associated electromagnet 23 will then be energized to arrest the actuator in its corresponding numerical position.

*Counter decade unit*

Figure 2:
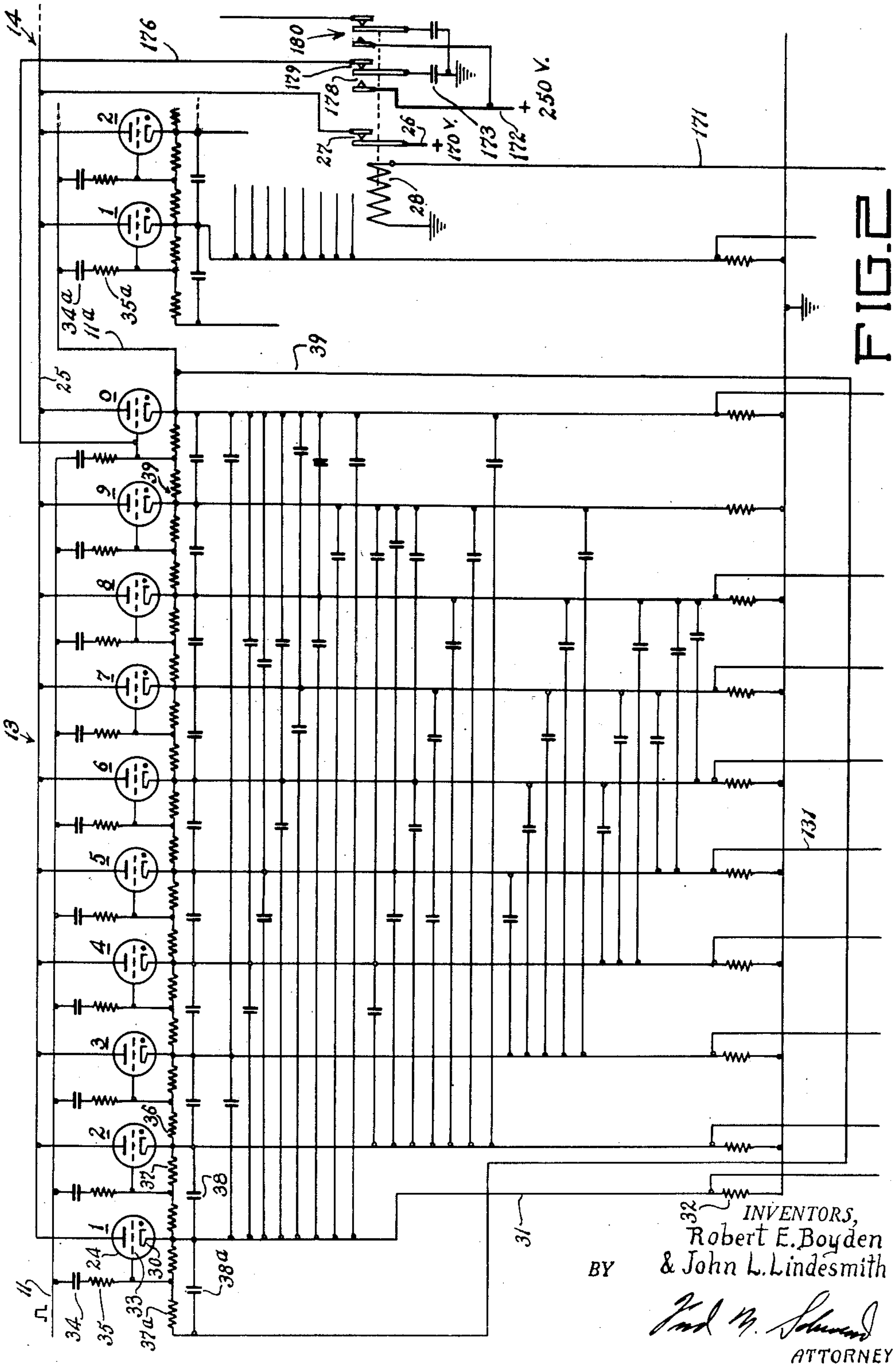

Although any of the various forms of counters operating on the decimal principle may be used, the counter chosen for the purpose of the present disclosure comprises, in each decade, ten gas type, cold cathode tubes like tube 24 (Fig. 2) preferably of the RCA type No. 5823. Such tubes have their digit registering values indicated directly adjacent each tube. The anodes of all the counter tubes are connected directly to an anode supply line 25 which is normally supplied with a positive potential of 170 volts from a source 26 through normally closed contacts 27 of a relay 28. The cathode, like cathode 30, of each counter tube is connected to a ground line 31 through a resistor, like resistor 32, of 33,000 ohms. The ignitor, like ignitor 33, of each counter tube is connected through an RC circuit comprising a capacitor, like capacitor 34 of 500 mmfd. and a resistor, like a resistor 35 of 150,000 ohms, to the pulse input line 11. Each ignitor is also connected to the cathode of its tube through a resistor, like resistor 37 of 560,000 ohms and to the cathode of the preceding tube by a resistor, like resistor 36, of 330,000 ohms.

The cathode of each counter tube is connected to the cathode of each other counter tube in the ring by a condenser, like condenser 38, of .02 mfd.

The values of the various cathode resistors, like resistor 32, and the value of the anode voltage supply is such that the counter tubes are normally maintained in non-conducting conditions. However, assuming one of the tubes, for example, the "0" counter tube, to be in conducting condition, the resultant rise in potential of its cathode will be applied through line 39 and resistor 37*a* to the ignitor of counter tube No. "1." Thus, the ignitor of the latter tube will be raised to a point just below the firing potential of the tube.

Upon reception of a positive pulse over line 11, such pulse will be applied to the ignitors of all counter tubes. However, the amplitude of such pulse will be insufficient to cause conduction of all such tubes except tube No. "1" whose ignitor is now primed. As tube No. "1" conducts, the consequent rise in potential of its cathode will be applied as a positive pulse through condenser 38*a* to raise the cathode of the preceding "0" tube sufficiently to extinguish the same. Similar pulses transferred through others of the condensers 38 will likewise be applied to the cathodes of the other counter tubes to prevent firing thereof. This sequence of events will progress through the ring in a similar manner.

Upon registration of "nine," the No. "9" counter tube will conduct and the consequent rise in potential of the cathode thereof will be applied through a resistor 39 to the ignitor of the No. "0" tube of the same decade to prime the same. Therefore, application of the next or tenth pulse, applied over line 11, will fire the "0" tube of decade 13 and the incident rise of its cathode potential will be applied over a line 11*a*, forming the pulse line for decade 14, to fire whichever tube in decade 14 has been primed.

Decade 14 is similar in circuitry to decade 13 so that pulses applied over line 11*a* will be applied through RC circuits comprising capacitors, like capacitor 34*a* and resistors, like resistor 35*a*, to all ignitors of this decade.

*Read-out machine*

The read-out machine 20 is basically similar to the well-known commercially available Clary adding machine. The latter machine is disclosed in the patent to R. E. Boyden, No. 2,583,810, issued on January 29, 1952. The particular accumulating mechanism used in this machine is disclosed in the patent to E. P. Drake, No. 2,472,696, issued on June 7, 1949. The particular printer mechanism and its entrainment with the actuator racks is disclosed in the co-pending patent application of Bennett et al. Serial No. 334,632, filed February 2, 1953, now Patent No. 2,744,682.

Since the basic structure of the machine is disclosed in the above noted patents and application and is found in the commercially available Clary adding machine, only those portions which are related to or form part of the present invention will be disclosed in detail. Reference may be had therefore, to the above patents and application for a disclosure of the basic machine. However, it is to be understood that the invention is not limited to the particular machine disclosed, but may be applied to any similar machine.

The machine includes a series of the aforementioned denominational orders, each including a differential actuator rack 40 (Fig. 4) and a bank of nine amount keys 41 ranging in digital values from "one" to "nine."

Each of the keys comprises a key top 41*a* and key stem 41*b* guided in aligned slots formed in a top plate 43 and a bottom plate 44, comprising a key board frame supported by the frame of the machine.

The bottoms of the key stems cooperate with spaced shoulders 45 formed on the upper edge of the aligned rack 40 to limit the forward advance of the rack to a distance corresponding to the value of the depressed key.

The keys 41 in each bank are yieldably pressed upward by a tension spring 49 extending the length of the key board and suitably attached at opposite ends to the plate 43. Each spring 49 rests upon cross ribs 46 extending across slots 47 formed in the plate 43. Upon depression of a key, the adjacent portions of the spring are stretched and extend downward through the aligned slot 47.

Means are provided for locking any of the keys 41 in its depressed position and for releasing any other depressed key in the same bank. For this purpose, each key stem has a cam lobe 48 (Fig. 7) formed on one edge thereof and arranged so that when the key is depressed it engages a locking bail 50. The latter is pivoted at either end thereof to front and rear upstanding walls of the plate 44 by trunnion bearings 51. As the key is further depressed its cam lobe will rock the bail 50 outwardly and as the lobe passes below the bail 50, the latter will retract partially under the action of a spring 52 to a position wherein it latches the key depressed.

A zero block 53 extends downwardly from the locking bail 50 and, when no key in the bank is depressed, the bail 50 will locate the zero block in a position directly in front of one of the stop shoulders 45 of the associated rack, thereby preventing substantial forward movement of the rack during the subsequent cycle of the machine. However, when any amount key is depressed and latched down, the locking bail 50 will be held outwardly sufficiently to retain the associated zero block out of the path of the aligned rack.

The various racks 40 are guided for fore and aft movement by shafts 54 and 55 embraced by guide slots 56 and 57, respectively, in each rack.

Figure 3:
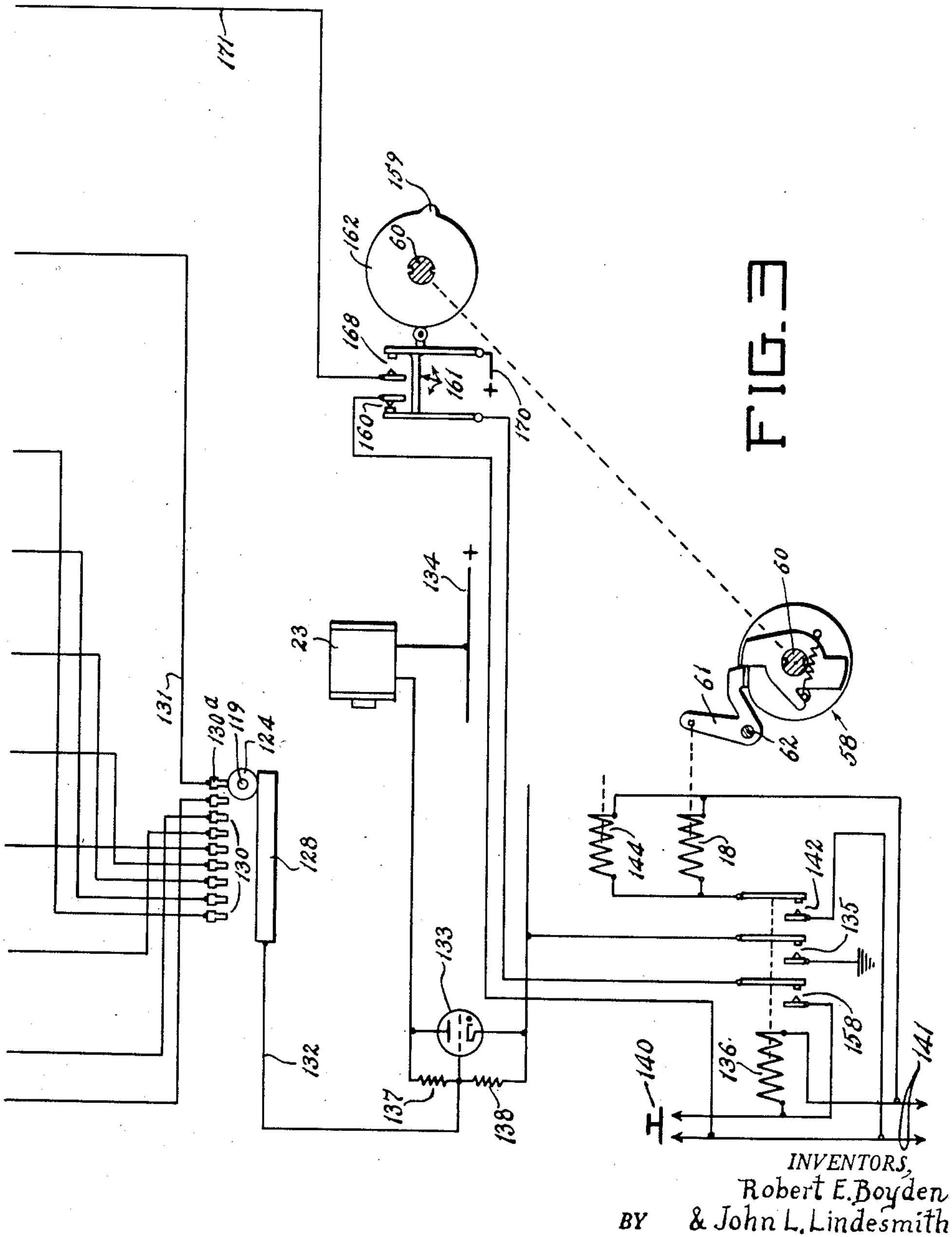

The machine is driven by a suitable motor (not shown) through a cyclic clutch generally indicated at 58 (Figs. 3 and 6), the driven side of which is operatively connected to a rotatable drive shaft 60. The latter is effective (through means not shown), during rotation thereof to advance the shaft 55 from its full line position illustrated in Fig. 4 to its dotted line position 55*a* during the first half of a machine cycle and to thereafter return the shaft during the latter half of the cycle.

The clutch 58 is controlled by a clutch dog 61, pivoted at 62, and normally urged by a spring 63 into its illustrated position where it maintains the clutch in disengaged position. Counter-clockwise rocking of the clutch dog by either of two means to be described hereinafter, will enable engagement of the clutch to drive the shaft 60 through a complete revolution.

Means are provided for enabling the drive shaft 55 to yieldably advance the various racks 40 through nine increments of travel or until arrested by depressed amount keys during an add operation or by an arresting pawl 64 during a read-out operation. For this purpose, each rack 40 is yieldably connected to the shaft 55 by a pair of opposed driving pawls 65 pivotally mounted on the shaft 55 and provided with rollers 66 normally engaging in latteral depressions formed at the closed end of the rack slot 57. A spring 67 extending between the pawls normally holds the rollers 66 in the slot depressions until the rack is arrested. Then, the rollers move out of the depressions and ride along the edges of slot 57.

*Accumulator*

Figure 4:
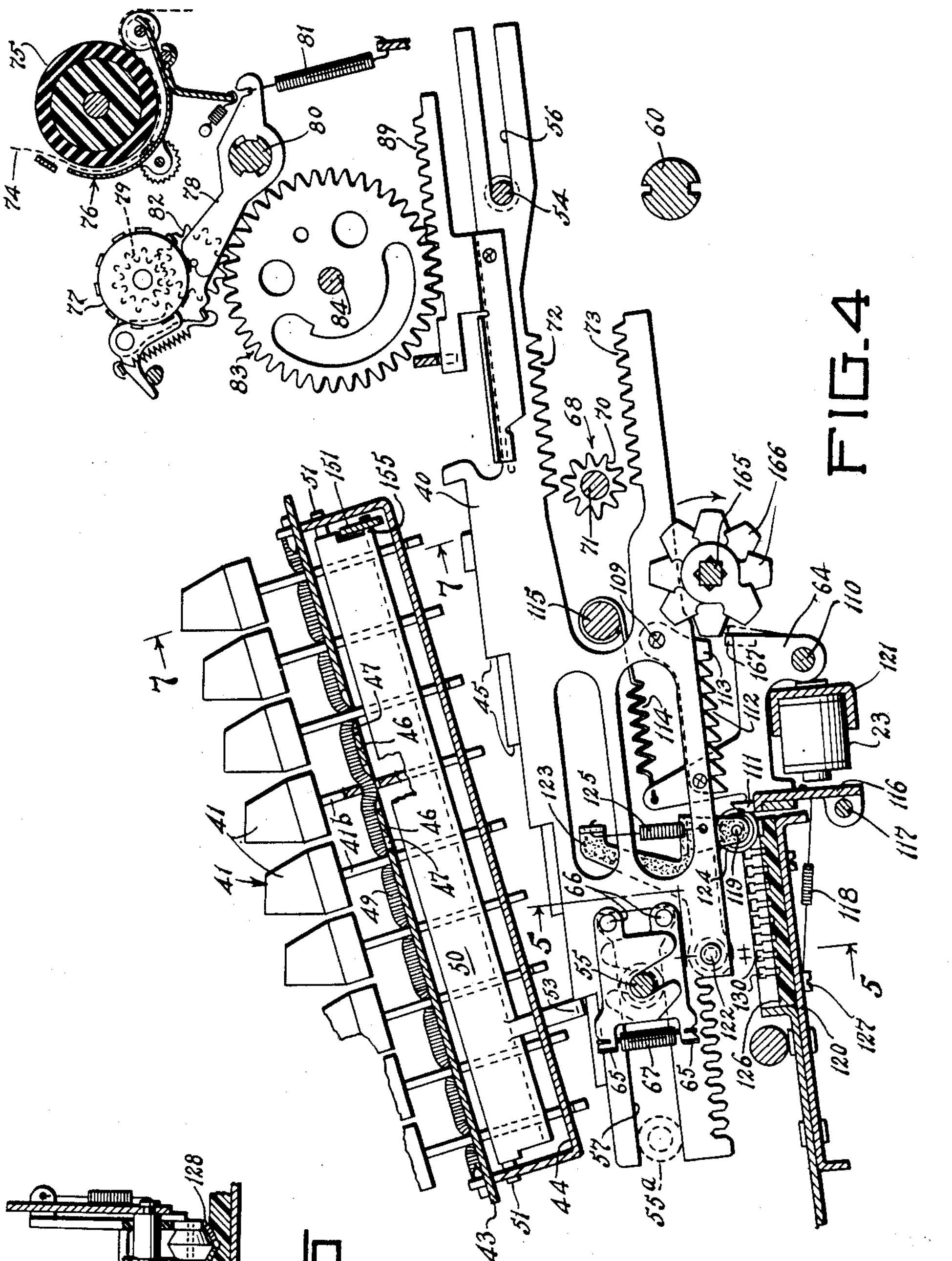
Fig. 4 is a longitudinal sectional view of the read-out machine, illustrating a differential actuator, mechanical accumulator and printing instrumentalities.

The read-out machine includes an accumulator, generally indicated at 68, operatively associated with the various racks 40. The accumulator comprises a series of ordinally arranged gears 70 independently and rotatably mounted on an accumulator shaft 71. The accumulator is normally maintained in its neutral position, as shown in Fig. 4, but is raised or lowered by means (not shown) to mesh the accumulator gears 71 with upper or lower rack gear sections 72 and 73 respectively, of the various racks, depending upon the type of operation to be performed. During normal adding or read-out operations, and at the start of a machine cycle, the accumulator is raised to mesh the gears 70 with the upper rack sections 72, whereas during totalling operations, the accumulator is lowered to mesh the gears with the rack sections 73. In either case, the accumulator is returned to neutral position after advancement of the racks and before their return.

*Printer*

The various values represented by the numerical positions to which the racks 40 are advanced during addition and read-out operations are printed on a paper tape 74. The latter is fed from a suitable supply source (not shown) and around a platen 75 which carries the tape to a printing station 76 where a value represented by the positioning of the racks is printed.

The printer comprises a series of numeral printing wheels 77, each operatively associated with a respective one of the racks 40. Each printer wheel has spaced around its periphery a series of digit type ranging in value from "0" to "9," and these wheels are so entrained with their racks 40 that they will print digits corresponding to the numerical positions to which the racks are moved during their forward advancement.

Each wheel 77 is rotatably mounted on a separate lever 78 which is loosely keyed on a printer control shaft 80 and is spring urged clockwise by a tension spring 81. A gear 79 integral with each wheel is permanently meshed with a gear 82 also rotatably mounted on the associated printer lever 78. Except during printing operations, the levers 78 are held by the control shaft 80 in their positions shown in Fig. 4 wherein each of the gears 82 meshes with one of a series of idler gears 83 rotatably mounted on a fixed support shaft 84.

The latter idler gears are continuously enmeshed with offset rack sections 89 carried by the various racks 40.

After the rack drive shaft 55 has reached its dotted line position 55*a* and before its return, the printer control shaft 80 is rocked clockwise by means (not shown), permitting springs 81 to rock the levers 78 clockwise to effect printing. The shaft 80 is then returned to its original position to return to the levers 78 to mesh the gears 82 with the idlers 83 before the racks are returned.

*Add controls*

Add operations are initiated by the depression of an add bar (90, Figs. 1 and 6), which causes engagement of the clutch 58 and operation of the machine to enter amounts set upon the key board into the accumulator and to print such amounts. As noted hereinbefore the accumulator 68 is automatically raised to mesh the accumulator gears 70 with the upper rack sections 72 of the racks during forward advancement of the latter and to return the accumulator to its neutral illustrated position during return of the racks, so that amounts accumulated will be retained.

Figures 6, 7:
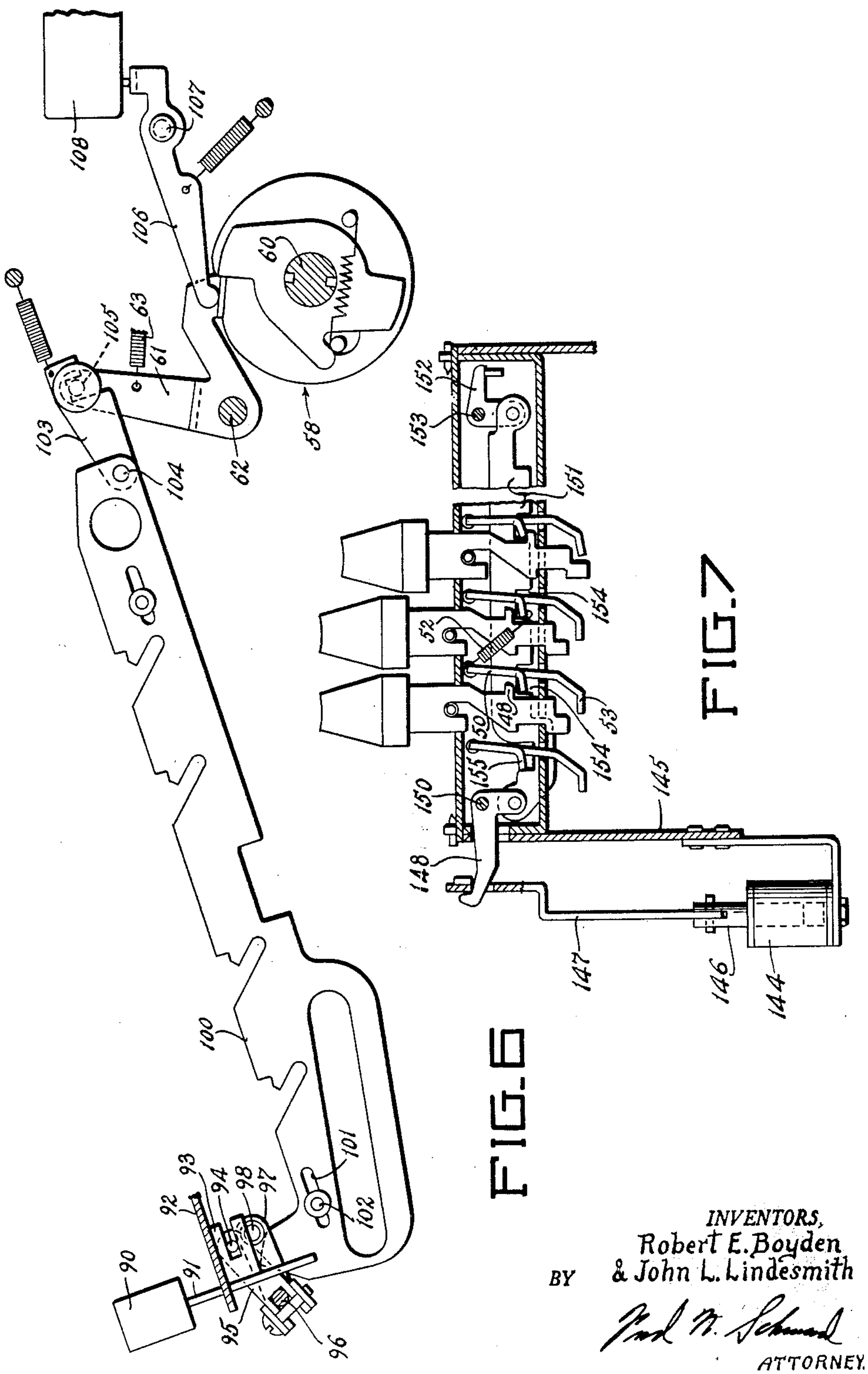
Fig. 6 is a side view illustrating part of the clutch controls.
Fig. 7 is a transverse sectional view, with parts broken away, illustrating the key board and key lock releasing device, and is taken substantially along the line 7—7 of Fig. 4.

Referring to Fig. 6, the add bar 90 comprises a stem 91 guided in slotted brackets, one of which is shown at 92, and has a bifurcated ear 93 formed thereon and embracing a pin 94 on an arm 95. The latter is suitably secured to rock shaft 96 carrying a second arm 97. A pin 98 in this arm is located over an inclined camming surface formed on a clutch control bar 100. This bar is provided with elongated guide slots 101 slidable over frame pins 102.

A hook 103 is pivotally connected to the clutch control bar 100 at 104 and is normally coupled to the aforementioned clutch control dog 61 by a pin and slot connection 105. Thus, upon depression of the add bar, the clutch control bar 100 will be advanced to the left in Fig. 6, rocking the clutch dog 61 to cause engagement of the clutch 58.

The clutch dog underlies a switch control lever 106 pivoted at 107 and having an operative connection with a normally open motor switch 108. Therefore, as the clutch dog 60 is operated to cause engagement of the clutch, the switch control lever 106 will be rocked clockwise, causing switch 108 to complete the motor circuit.

*Read-out controls*

In accordance with the present invention, each of the actuator racks 40 is arranged to be arrested in any of its nine different numerical positions during a read-out operation by a respective one of the aforementioned arresting pawls 64.

Each pawl 64 is pivoted on a stationary cross rod 110 supported by the machine frame. A pawling tooth 111 formed on each pawl is adapted to engage one of nine equally spaced teeth 112 formed on a toothed bar 113 which is secured by rivets 109 to the side of the associated rack 40.

A spring 114 is tensioned between each pawl and a cross rod 115 to urge the pawl upward toward pawling engagement with the toothed bar 113 but is normally prevented from so doing by a latch 116. The latches 116 are pivotally supported on a stationary cross rod 117 and each is held in latching engagement with its pawl 64 by a spring 118 tensioned between the latch and a screw 127 carried by a cross brace 120 forming part of the machine frame.

Each latch 116 forms the armature of a respective one of the aforementioned magnets 23, the latter being suitably secured within a channel member 121 supported in a manner (not shown) by the machine frame in close proximity to the latches.

Figure 5:
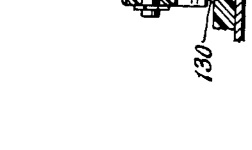
Fig. 5 is a transverse sectional view through one of the scanning devices and is taken along the line 5—5 of Fig. 4.

Describing now the means for scanning the various counting stages of the counter decades in synchronism with respective ones of the actuator racks 40 and energizing the electromagnets 23 accordingly, each rack has a pin 122 (see also Fig. 5) attached thereto on which is pivoted a contact roll holder 123 formed of plastic or other insulating material. The lower portion of the holder 123 is U-shaped and the resulting legs support opposite ends of a pin 119 on which is rotatably mounted a double conical contact roller 124 of metal. A spring 125 is tensioned between the upper end of each holder 123 and the associated rack to urge the contact roller 124 into a V-shaped groove formed in a block 126 of insulating material, such as plastic, secured by screws 127 to the upper surface of the cross brace 120. A conductor strip 128 of metal is suitably bonded to one side of the V-groove in each block 126 and a series of separate spaced contacts 130 are embedded in and bonded to the opposite side of the V-groove. The contacts 130 are electrically insulated from each other and from the conductor strip 128. Thus, as each actuator rack advances through its different numerical positions, the associated contact roller 124 will roll along conductor strip 128 into bridging contact with successive ones of the contacts 130.

As shown in the circuit diagrams (Figs. 2 and 3) each contact 130 is electrically connected through a line, like line 131, directly to the cathode of a respective one of the counter tubes in the associated decade. It will be noted however, that no contact and connection is provided for the "9" counter tube.

Each conductor strip 128 is electrically connected through a respective line 132 to the ignitor of an amplifier tube 133 forming part of one of the amplifier circuits 22 (Fig. 1). The latter tube is preferably of the aforementioned No. 5823 type and the anode thereof is connected in series with an associated electromagnet 23 and a 170 volt anode supply source 134. The cathodes of all amplifier tubes, like tube 133, are adapted to be connected to ground through normally open contacts 135 of a read-out control relay 136.

Resistors 137 and 138 in the anode-ignitor and cathode-ignitor circuits, respectively, of the tube 133 act to bias the ignitor to a point just below the firing potential of the tube.

The contacts 130 are spaced apart distances equal to the distances between the numerical positions of the respective rack 40. Also, the contact 130*a*, connected to the "0" counter tube is located in contact with the roller 124 when the actuator rack is in zero or home position. Therefore, during a read-out operation (in which a relay 136 is energized) and when the actuator rack reaches a numerical position representing the digital registration of the associated counter decade, the corresponding rise in potential is derived from the associated amplifier tube 133 to fire the same. The respective electromagnet 23 will accordingly be energized to arrest its rack 40.

It should be noted that in cases where a counter decade registers the value "nine," the corresponding actuator will move unhindered to the end of its travel during which time it will advance its accumulator gear 70 and printer wheel 77 nine increments, causing the latter to place its "9" print type character in printing position.

For the purpose of initiating a read-out operation, the winding of the read-out control relay 136 is connected in series with a normally open switch 140 across a power supply circuit 141. The relay 136, when energized, is effective to cause engagement of the machine clutch 58, operation of the machine, and retraction of the various amount key locking bails 50 so as to release any depressed amount keys 41 and remove the zero blocks 53 from blocking relation with the racks.

Normally open contacts 142 of relay 136 are connected in circuit with solenoids 18 and 144 across the power supply circuit 141.

Solenoid 18 has its plunger operatively connected to the aforementioned clutch dog 61 and is effective upon energization to rock the clutch dog 61 counter-clockwise to close the motor circuit and cause engagement of the clutch 58.

The solenoid 144 (see also Fig. 7) is suitably supported on a frame plate 145 comprising part of the machine frame. The plunger 146 of this solenoid is connected through a link 147 to a bell crank 148 pivotally supported at 150 on the keyboard frame. A depending arm of the bell crank 148 supports one end of a key lock release bar 151, the opposite end of which is pivotally supported by the depending arm of a similar bell crank 152 also pivotally supported at 153 by the key board frame. The bar 151 is provided with a series of notches 154 embracing rearward extensions 155 (see also Fig. 4) on all of the key locking bails 50. Thus, energization of the solenoid 144 will force the bar 151 to the right, in Fig. 7, thereby rocking all of the lock bails 50 to release any depressed amount keys and move their zero blocks 53 out of the paths of the racks 40.

It is necessary to maintain the relay 136 energized throughout the first half of a machine cycle, i. e., during possible forward movement of the actuator racks, so that the tube 133 may be fired at any time during this time. For this purpose, a locking circuit is provided for the relay 136 and comprises normally open contacts 158 (Fig. 3) of the relay 136 located in series with normally closed contacts 160 of a switch 161, this circuit extending across the contacts of the switch 140.

The switch 161 is controlled by a cam 162 keyed to the main machine shaft 60. When relay 136 is energized by closing of switch 140 the above locking circuit will hold the same energized until approximately the 180° point in the machine cycle, whereupon a lobe 159 of cam 162 will actuate the switch 161 to open the contacts 160, permitting the relay 136 to de-energize.

Since the contacts 135 of the relay 136 are now opened, the scanning system, including the contact rollers 124, will be ineffective to control the rack arresting devices during return of the racks.

During the latter half of a machine cycle in which all the various racks 40 are being returned to their zero positions, a tens transfer shaft 165 is rotated through a complete revolution as is described in the aforementioned Boyden and Drake patents. Mounted on the shaft 165 is a helically arranged series of cams 166, each aligned with an ear 167 formed on a respective arresting pawl 64. Therefore, during return of the racks, the cams 166 will engage and rock the pawls 64 downwardly into their illustrated ineffective positions wherein they will be retained by the latches 116.

It is desired to return the counter to zero registration after the racks have advanced to their different numerical positions, i. e., at the end of 180° of a machine cycle, so that the counter may again accumulate, during return of the racks, i. e., during the latter half of the machine cycle. For this purpose, normally open contacts 168 of the switch 161 are closed by the cam 162 when contacts 160 are opened, i. e., at approximately 180° in the machine cycle, to connect a source of positive potential 170 through a line 171 to energize the aforementioned relay 28. As the normally closed contacts 27 of this relay open, anode potential is removed from the anode supply line 25 and, consequently, from the counter tube anodes, rendering all such tubes non-conducting. Simultaneously, normally open contacts 178 of the relay 28 close, and normally closed contacts 179 thereof open, completing a circuit from a plus 250 volt supply line 172 to one side of a condenser 173, the other side of which is grounded. As the cam 159 passes the switch 161 to enable de-energizing of the relay 28, contacts 179 thereof again close, connecting the now charged condenser 173, through line 176, to the ignitor of the "0" counter tube in the decade 13.

The potential, i. e., 250 volts, now applied to the ignitor of the "0" tube is effective to fire such tube in the absence of a priming potential applied thereto. Similar contact and condenser connections, such as indicated generally at 180 are provided for respective ones of the "0" counter tubes of the remaining decades. Accordingly, all decades will at this time be in zero registration, permitting accumulation of a new series of pulses even before the machine has completed its cycle.

Although we have described our invention in detail in its preferred embodiment and have therefore utilized specific terms and languages herein, it is to be understood that the present disclosure is illustrative rather than restrictive and that certain changes and modifications may be made without departing from the spirit or scope of the claims appended hereto.

Having thus described the invention what we desire to secure by United States Letters Patent is:

1. A read-out system for recording amounts registered by an electronic apparatus having a plurality of output terminal connections, each terminal connection representing a different digit and indicating by a potential distinct from the rest a corresponding digit registration of said apparatus; comprising the combination of a recording device settable to different recording positions, means comprising a differential actuator rack for said recording device, means for advancing and retracting said actuator rack, and an arresting device for arresting said actuator rack during advancement thereof in any of different positions corresponding to said different positions of said recording device, a scanning device operatively connected to said actuator for successively scanning said terminal connections and for causing actuation of said arresting device upon scanning a terminal connection representing a said distinct potential, and means automatically operable by said advancing and retracting means after advancement of said actuator rack and substantially before retraction thereof for rendering said scanning device ineffective and for resetting said electronic apparatus.

2. A read-out system for accumulating amounts registered by an electronic apparatus having a plurality of output terminal connections, each output terminal connection representing a different digit and indicating by a potential distinct from the rest a corresponding digit registration of said apparatus; comprising the combination of an accumulating device settable into different accumulating positions, means comprising a differential actuator rack for said accumulating device, means for advancing and retracting said actuator rack, and an arresting device for arresting said actuator rack during advancement thereof in any of different positions corresponding to said positions of said accumulating device, a scanning device operatively connected to said actuator rack for successively scanning said terminal connections and for causing actuation of said arresting device upon scanning a terminal connection representing a said distinct potential, and means automatically operable by said advancing and retracting means after advancement of said actuator rack and substantially before retraction thereof for rendering said scanning device ineffective and for resetting said electronic apparatus.

References Cited in the file of this patent

UNITED STATES PATENTS

| | | |
|---|---|---|
| 1,005,555 | Kettering | Oct. 10, 1911 |
| 1,916,987 | Peirce | July 4, 1933 |
| 2,404,739 | Mumma | July 23, 1946 |
| 2,497,784 | Mehan et al. | Feb. 14, 1950 |
| 2,604,262 | Phelps | July 22, 1952 |
| 2,682,995 | Carey et al. | July 6, 1954 |